Patented May 12, 1936

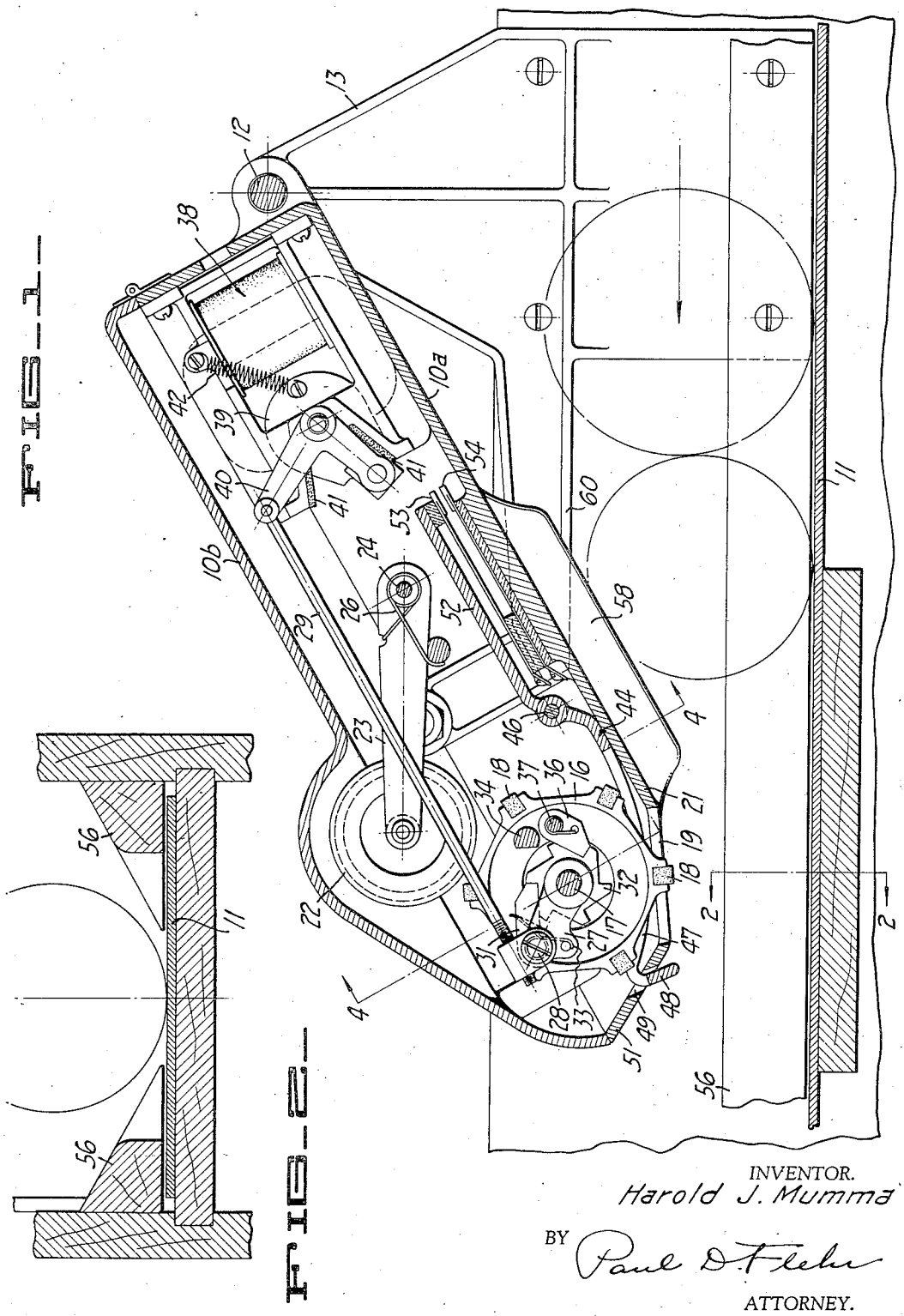

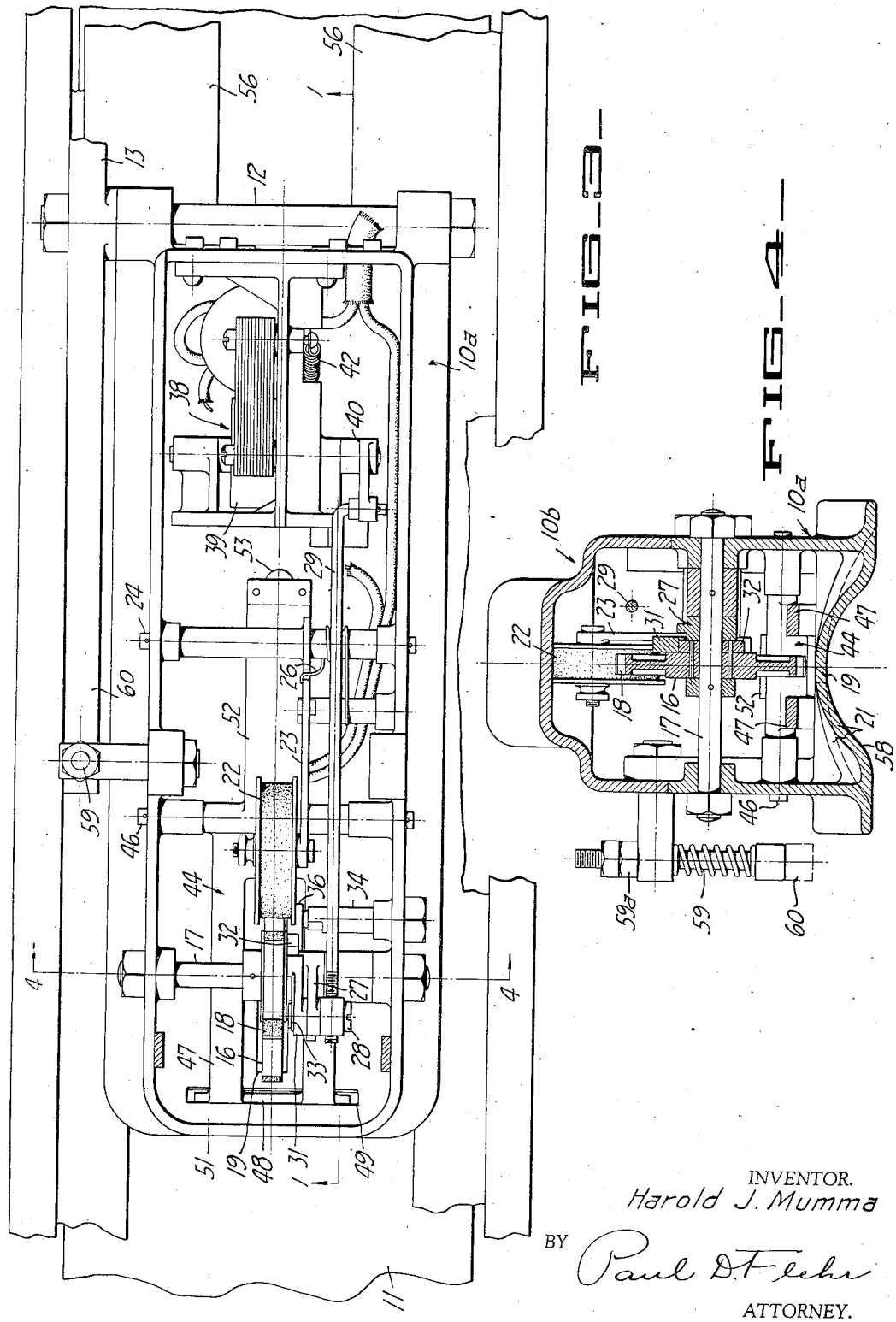

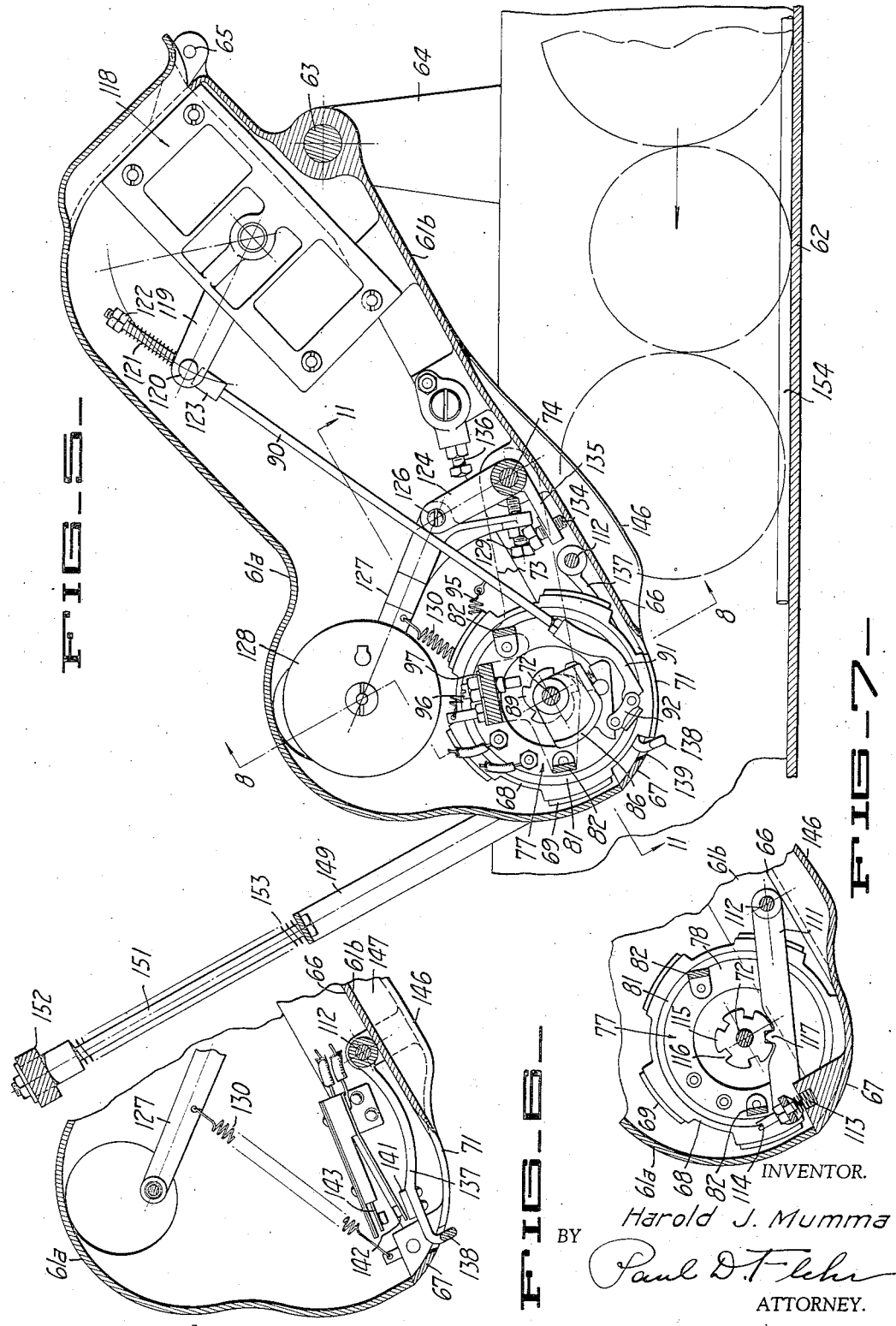

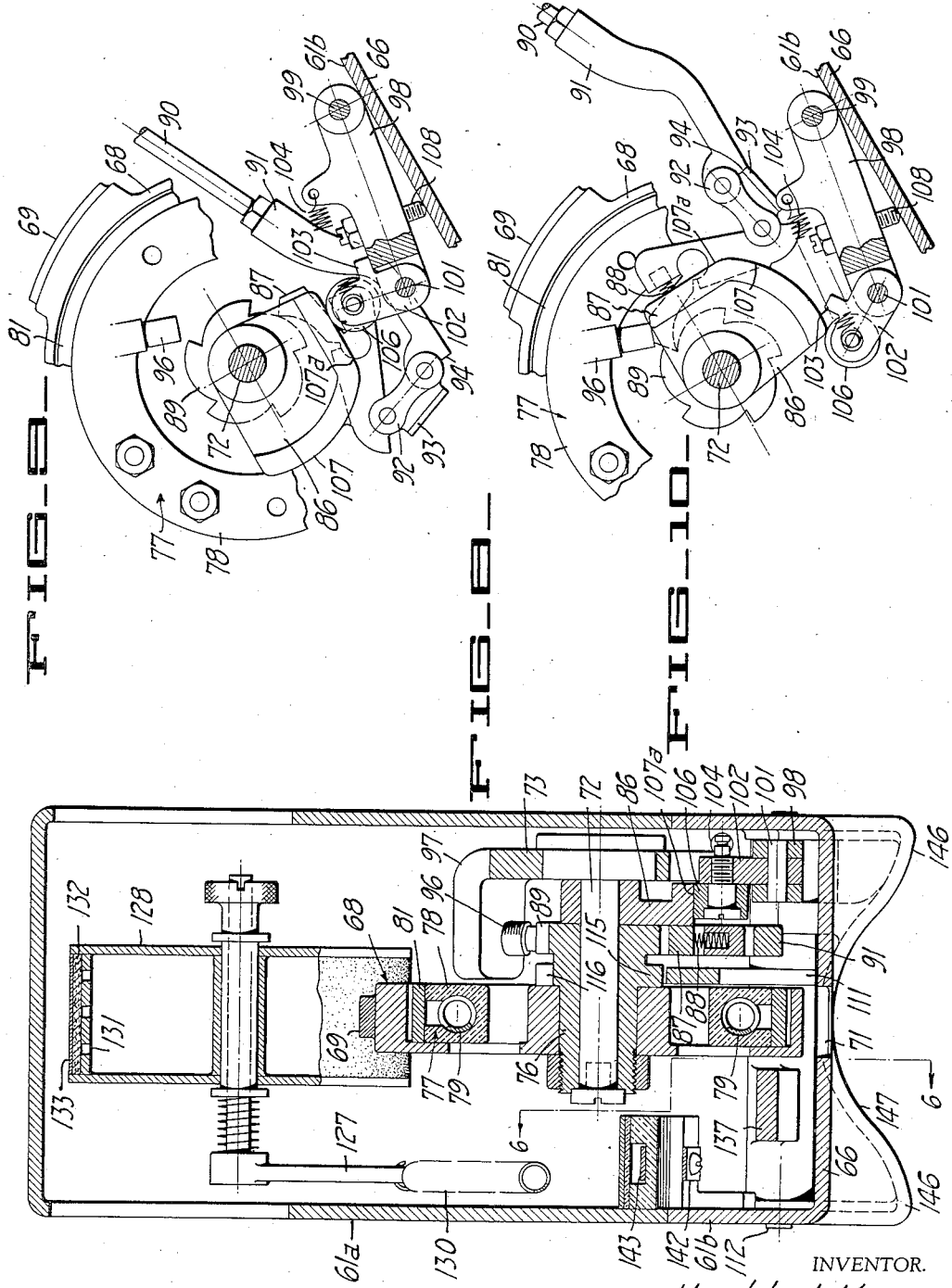

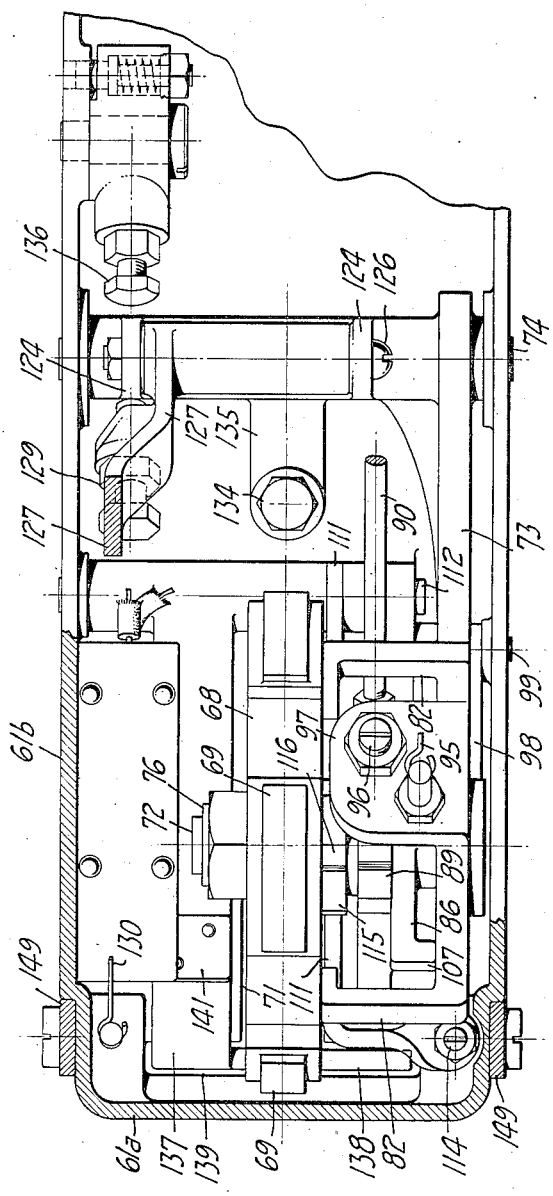

2,040,526

UNITED STATES PATENT OFFICE 2,040,526

FRUIT MARKING APPLIANCE

Harold J. Mumma, Glendale, Calif.

Application September 3, 1935, Serial No. 38,987

14 Claims. (Cl. 101—37)

This invention relates generally to appliances for the marking or branding of various articles of fruit, particularly citrus fruit, such as oranges, grapefruit, lemons and the like.

It is an object of the invention to provide an appliance of the above character which will be relatively simple and inexpensive compared to fruit marking machines constructed in the past.

Another object of the invention is to provide a fruit marking appliance which can be readily installed in fruit packing houses, and which will afford wide flexibility with respect to the kinds and sizes of fruit being marked, and with respect to the capacity afforded. In this connection the present invention is characterized by relatively simple mechanical units, which can be installed in batteries of any desired number, to afford the capacity desired.

Further objects of the invention will appear from the following description in which the preferred embodiments of the invention have been set forth in detail in conjunction with the accompanying drawings.

Referring to the drawings:

Fig. 1 is a side elevational view, in cross section illustrating an appliance constructed in accordance with the present invention, which is intended primarily for applying a temporary marking to the fruit.

Fig. 2 is a cross sectional detail, taken along the line 2—2 of Fig. 1.

Fig. 3 is a plan view of the appliance as shown in Fig. 1, with the casing swung upwardly to a substantially horizontal position, and with the cover of the casing removed to expose working parts.

Fig. 4 is a cross sectional detail taken along the line 4—4 of Fig. 1.

Fig. 5 is a side elevational view in cross section, similar to Fig. 1, but showing a modification which is intended primarily for the permanent marking of fruit.

Fig. 6 is a cross sectional detail, showing the contact mechanism.

Fig. 7 is a cross sectional detail, showing mechanism for automatically locking the marking wheel in its different operating positions.

Fig. 8 is an enlarged cross sectional detail, taken along the line 8—8 of Fig. 5.

Fig. 9 is an enlarged detail, partly in cross section, showing the ratcheting mechanism for turning the marking wheel.

Fig. 10 is an enlarged detail, partly in cross section, showing the mechanism of Fig. 9 in different operating positions.

Fig. 11 is an enlarged cross sectional view taken along the line 11—11 of Fig. 5.

Referring first to Fig. 1, I have shown a casing, formed of two parts 10a and 10b, which overlies the upper run 11 of a belt conveyor. The upper end of the casing is journaled to a horizontal shaft 12, which in turn is carried by the fixed support rack 13. It is therefore evident that the free end of the casing, that is, the lower end, as viewed in Fig. 1 is free to move in a vertical direction, to permit articles of fruit to roll beneath the same. The upper casing part 10b forms a hinged cover, to permit access to the mechanism carried within the casing.

Within the lower end of casing, there is a wheel 16, which is journaled upon shaft 17. The ends of this shaft are mounted in the side walls of the casing. Mounted upon the periphery of wheel 16, are the circumferentially spaced marking or stamping dies 18, which are formed of suitable material such as resilient rubber. The marking die on the lower side of wheel 16 is accommodated by an opening 19, which is formed in the lower casing wall 21. Overlying the wheel 16, there is an inking roller 22, which is journaled to the free end of a support arm 23. Arm 23 is in turn pivotally supported by horizontal shaft 24, and is urged by spring 26 in a direction to bring the periphery of the inking roller 22 into contact with the marking dies.

Means including ratcheting mechanism serves to automatically shift the position of wheel 16 after each marking operation. The ratcheting mechanism includes an arm 27, which is journaled to shaft 17. The free end of arm 27 has a pivotal connection 28, to a reciprocating operating rod 29. A pawl 31 is likewise carried by the pivotal connection 28, and is adapted to engage the teeth of a ratchet wheel 32. This ratchet wheel is fixed with respect to wheel 16, so that when rotated, wheel 16 is likewise rotated to bring successive marking dies 18 into operative position within the opening 19. A spring 33 is shown for normally urging pawl 31 towards engaged position. Movement of the pawl 31 to the right, as viewed in Fig. 1, can be limited by suitable means such as a stop pin 34, which is shown being supported by the side wall of the lower casing (Fig. 3). A stationary lock pawl 36 is also shown carried by stationary pin 37, and serves to engage the teeth of ratchet wheel 32 to prevent back rotation.

The motive means for reciprocating rod 29 consists of an electric motor 38, mounted in the upper end of the casing part 10a. The details of this electric motor need not be explained; it being sufficient to state that its armature 39 is connected to an oscillating L-lever 40. One arm of this lever is connected to the corresponding end of operating rod 29. The other arm is arranged to engage a cushioned stop 41, to limit rotation of the L-lever 39 in a counterclockwise direction. A tension spring 42 is shown for biasing the motor armature in one direction, so that when the motor is de-energized, the parts occupy the position illustrated in Fig. 1.

In order to control energization of the electric motor 38, contacting mechanism is provided as follows: A trip lever 44 is fulcrumed upon shaft 46, and has its arm portion 47 extending to a point beyond the casing opening 19. Attached to the end of arm portion 47, there is a laterally extending fruit contacting bar 48. This bar is accommodated in a laterally extending opening 49, which is provided in the wall portion 51. The rearwardly extending arm portion 52, of trip lever 44, engages a movable contact 53, which is adapted to cooperate with a relatively stationary electrical contact 54. It will be evident that when bar 48 is moved upwardly with respect to the casing, by an article of fruit, contacts 53 and 54 are closed, to energize the electric motor 38.

Suitable means can be provided in conjunction with the conveyor, to insure passage of fruit in single file, beneath the casing. For example, as shown in Fig. 2, convergent tapered strips 56 overlie the conveyor belt 11, to direct the fruit in a single file, so that all of the fruit will be subjected to a marking operation. In order that an article of fruit, upon engaging the lower wall of casing part 10a, may not be displaced toward one side or the other, a portion of the lower casing wall is preferably made concave as indicated at 58 in Fig. 4. It is also desirable to employ some form of adjustable means to limit downward movement of the casing, thus facilitating adjustments for different sizes of fruit. Thus a spring pressed plunger 59 is slidably carried on one side of the casing part 10a, and the lower end of this plunger engages a fixed member 60, when the casing is swung downwardly. By adjusting the lock nuts 59a carried by plunger 59, the normal position of the casing can be varied.

Operating of the appliance can now be reviewed as follows: An article of fruit, such as an orange, being moved along by the conveyor belt 11, contacts with the lower wall of casing part 10a, at a point somewhat in advance of the opening 19, as for example, the concave portion indicated by numeral 58 in Fig. 4. Upon establishing such engagement, the orange continues to advance by virtue of rolling movement in a clockwise direction, as viewed in Fig. 1. The free end of the casing is moved upwardly as the orange advances, until the orange rolls beneath that portion of the casing having the opening 19. Here the orange is rolled under and in contact with one of the marking dies 18. After rolling beyond the marking die, the orange contacts and elevates the bar 48 with respect to the casing, thus causing the electrical contacts 53 and 54 to close. Immediately upon closing of these contacts, the electric motor 38 pulls upon the operating rod 29, and the ratchet wheel 32 is turned to a definite angular increment, to bring a successive marking die into position within the opening 19. Contacts 53 and 54 remain closed only for a short interval, until the orange has passed beyond the bar 48. When this occurs the contacts open, to de-energize the motor 38, and to permit the operating rod 29 to return to its original position. During an angular turning movement of the wheel 16, as just described, one of the upper marking dies 18 passes beneath and into contact with the inking roller 22, to receive an application of ink.

In the modification of Figs. 5 to 10 inclusive, heating means is provided for the marking dies, in order to lend permanency to the impressions. In this instance the casing formed of the upper and lower parts 61a and 61b, is shown likewise disposed above the upper run 62 of a belt conveyor, and is supported by the horizontal shaft 63, which in turn is carried by the support bracket 64. The upper casing part 61a forms a removable cover, which has a hinged connection 65 to the lower casing part 61b. The lower casing wall 66, which is contacted by the articles of fruit, merges with a lower curved wall portion 67, under which articles of fruit roll during the marking operation. The wheel 68, which overlies the curved wall portion 67, carries circumferentially spaced marking dies 69. These dies are accommodated in an elongated slot or opening 71 in the curved wall portion 67. The dies in this instance are made of metal, since they are normally maintained at an elevated temperature. For mounting wheel 68, a stub shaft 72 is carried by an arm 73, and this arm in turn is pivotally carried by the fixed shaft 74. Surrounding shaft 72 there is a sleeve 76, upon which the hub of wheel 68 is secured.

In order to maintain the dies 69 at a proper elevated temperature, a heating unit 77 of annular form is provided. While the construction of this heating element may vary, it is shown formed of an annular refractory body 78, which encloses the coil resistance conductor 79, and which is surrounded by the metal ring 81. Suitable clearance is maintained between this heater and the adjacent portions of the wheel 68, whereby although the wheel may rotate while the heater is stationary, heat is conducted to the wheel and to the metal dies 69 carried by the wheel. The heating elements can be supported by suitable means, such as lugs 82, which in turn are carried by the arm 73.

The means for shifting wheel 68 is constructed as follows:—Journaled to the stub shaft 72, between the arm 73 and the adjacent end of sleeve 76, there is a sector member 86. This sector member carries a pivoted pawl 87, which is urged by spring 88 into cooperative engagement with a ratchet wheel 89, this wheel being formed on the adjacent end portion of sleeve 76. A reciprocating actuating rod 90 has its one end connected to the sector 86 thru a rod extension 91 and the connecting link 92. A stop 93 carried by link 92, engages the shoulder 94 formed on the extension 91, thereby making it impossible for the link to shift past dead center position with respect to the longitudinal pull axis of rod 90. A tension spring 95 serves to normally retain rod 90 in an elevated position, with stop 93 in engagement with shoulder 94. Turning of the sector member 86 in a counterclockwise direction, as viewed in Figs. 9 and 10, can be limited by a stop pin 96, which is shown being carried by the portion 97 of arm 73.

Cam elements for elevating the wheel 68, and for dropping this wheel after it has been turned a predetermined angular amount, is constructed as follows:—Below the sector 86, there is an arm 98, one end of which is carried by the fixed shaft 99. The free end of this arm has a pivotal connection 101, with a trip lever 102. Swinging of lever 102 in a clockwise direction as viewed in Figs. 9 and 10, is limited by lug 103, and the lever is normally biased to swing in such direction, by the tension spring 104. A cam roller 106 is carried by lever 102, which is adapted to engage a cam surface 107, formed on the sector 86. It will be noted that the main portion of cam surface 107 is formed on the arc of a circle, having a radius drawn from the center of shaft 72. The remaining portion 107a of the cam surface is flattened. The positioning of arm 98 with respect to the casing, can be adjusted by means of a screw 108, the lower end of which contacts with the lower wall 66 of the casing. When the parts occupy the position as viewed in Fig. 9, wheel 68 is in its lowered position, and lever 102 is in its limiting upright position with respect to the arm 98. When rod 90 is pulled to swing the sector member 86 in a counter-clockwise direction, pawl 87 engages the teeth of ratchet wheel 89 to journal with the wheel 68, and at the same time the cam surface 107, by rising upon roller 106, serves to elevate the wheel with respect to the casing. Near the end of the arcuate movement of sector member 86, cam surface 107 passed by roller 106, whereby the downward force of gravity causes lever 102 to trip to one side, as viewed in Fig. 10, thus permitting the wheel to drop down to its initial position. On the return stroke of operating rod 90, wheel 68 remains in its lowered position. Near the end of such return movement lever 102 is free to return to its initial position relative to arm 98, by virtue of the flattened cam surface portion 107a (Fig. 9). Thus as the wheel is being turned a definite angular amount to bring the fruit marking die 69 into operative position with respect to opening 71, it is in an elevated position to afford sufficient clearance under the wheel for the desired angular movement.

It is also desirable to provide means for automatically locking the wheel 68 in a given position, after angular turning movement of the same. Thus referring to Fig. 7, an arm 111 has its one end pivotally carried by a shaft 112. The free end of this arm is urged upwardly by compression spring 113, the tension of which can be adjusted by set screw 114. Immediately above the intermediate portion of arm 111, sleeve 76 is provided with a plurality of circumferentially spaced lugs 115, to afford spaced notches 116, and to form in effect a notched wheel. The upper edge of arm 111 carries a tooth 117, which is adapted to engage the notches 116. By reference to Fig. 9 it will be noted that initial angular movement of sector member 86 in a counter-clockwise direction, is not accompanied by rotation of the wheel 68, because of the lost motion afforded between pawl 87 and the teeth of ratchet wheel 89. Such lost motion is sufficient to effect elevation of the wheel 68, before turning of the same. While elevation of wheel 68 is accompanied by a certain amount of upward swinging movement of arm 111, by the time the wheel 68 is fully elevated, tooth 117 is nearly but not entirely retracted with respect to its associated notch 116. This is by virtue of the fact that upward swinging of lever 111 does not completely follow the upward movement of wheel 68, because of the limit to which spring 113 will expand. When the tooth 117 has been nearly retracted from its associated notch 116, the wheel 68 may rotate because of the rounded end afforded by tooth 117, which causes this tooth to ride over the periphery of one of the lugs 115. At the end of the angular movement of wheel 68, and before this wheel has had an opportunity to drop down to its initial position, tooth 117 springs part way into the next succeeding notch 116. As the wheel 68 drops down to its initial position the tooth 117 is completely projected into the associated notch 116, to afford a positive lock.

The electric motor 118 is mounted in the upper part of the casing, and has its arm connected to a lever 119, which is swung to the right as viewed in Fig. 5, when current is applied. The free end of this arm carries a sleeve 120, through which the operating arm 90 slidably extends. A compression spring 121 has its one end seated upon sleeve 120, and its other end seated upon the lock nuts 122, which are carried by the end of rod 90. Sliding movement of sleeve 120 in one direction, over rod 90 is limited by the collar 123. Thus when current is applied to the electric motor 118, pull is exerted upon rod 90 thru the compression spring 121, to perform the desired ratcheting and camming operations.

The inking means provided is somewhat similar to the inking means previously described with respect to Figs. 1 to 4 inclusive. Thus arm 73 carries extensions 124, having a fulcrumed connection 126 with an arm 127. The upper portion of fulcrumed arm 127 carries an inking roller 128. The lower portion of arm 127 carries a set screw 129, by means of which the lower limiting position of the roller 128 with respect to wheel 68, can be adjusted. A tension spring 130 has been shown for normally urging the inking roller towards wheel 68. A suitable construction for roller 128 is shown in Fig. 8. In this instance the roller is a hollow drum adapted to receive liquid ink, and provided with a perforated peripheral wall 131. Wall 131 is faced with a layer 132 of absorbent material, which in turn is surfaced by the inking ribbon 133.

To afford proper limits to the vertical movements of wheel 68, an adjustable set screw 134 has been shown carried by an arm 135, which in turn is fixed with respect to arm 73. This set screw bears against the lower casing wall 66, and by its adjustment, the lower position of the wheel 68 can be varied to properly position the marking dies for a marking operation. Likewise the limit to which arm 73 can be raised, can be adjusted by means of a suitable stop screw 136, which is contacted by one arm 124, and which is fixed with respect to the casing but can be swung out of position for cleaning purposes.

The trip means engaged by the articles of fruit, for controlling energization of motor 118, is somewhat similar to means described in connection with Figs. 1 to 4 inclusive. Lever 137 is pivotally carried by the casing, by pivot pin 112, and the free end of this lever carries a fruit contacting bar 138. This bar 138 is accommodated by a slot 139 in the casing, which is located adjacent one end of the die accommodating opening 71. As shown in Fig. 6, lever 137 carries an insulating tab 141, which when the lever 137 is raised, is adapted to engage and move a spring mounted contact 142. Contact 142 cooperates with an electrical contact 143, for closing the circuit to the electric motor 118.

As in the case of the previous modification described, the lower wall 66 of the casing is made concave, in advance of the die accommodating opening 71. This is evident by inspecting Figs. 5 and 8, in which it will be noted that the lower casing wall 66 is provided with depending portions 146, to form a concavity 147.

The marking dies 69 may of course carry any lettering or insignia which may be desired. It is preferable however to form the surfaces of these dies to a particular contour, such as illustrated in Fig. 5. It will be noted from this view that the contour corresponds to the arc of a circle having a radius somewhat greater than the distance from the center of shaft 72, with the center of such radius offset with respect to the center of shaft 72. Therefore, while that end of the die which is first contacted by the fruit may be substantially co-extensive with the adjacent casing surface, the end of the die surface which is last contacted by the fruit projects a substantial amount from the adjacent casing surface. Such an arrangement makes possible proper continued pressure between the die and the fruit throughout the marking operation, and at same time permits a more compact arrangement of parts within the casing.

In order to make possible an adjustment of the height of the casing for different sizes of fruit, the lower end of the casing has been shown connected with a yoke 149. This yoke is carried by the lower end of rod 151, the upper end of which is slidably extended through a fixed supporting bar 152. A compression spring 153 surrounds rod 151, to exert a certain amount of downward force upon the casing, when the casing is raised. It will be evident that by adjusting the length of rod 151, the position of the casing can be adjusted to suit the size of fruit being marked.

The conveyor utilized can be of the type commonly employed in fruit packing houses, or may be a special conveyor section to which the fruit is supplied, and which serves to carry the fruit in single file, beneath the appliance. In the modification illustrated, a pair of rods 154 overlies the upper run 62 of the conveyor, and these rods tend to converge beneath the casing to properly direct the fruit in single file into contact with the lower wall of the casing.

Operation of the appliance described with respect to Figs. 5 to 11 inclusive, can be outlined as follows:—An article of fruit such as an orange, is moved along by the upper run of the conveyor, until it contacts with the lower wall 66 of the casing. The surface of the orange is rolled over the surface of the die, which is accommodated at that time in opening 71, to perform the marking operation. At the time the marking operation is completed the orange lifts bar 138 to close contacts 142 and 143, and to energize the motor 118. Motor 118 pulls upon operating rod to cause wheel 68 to be elevated, after which the wheel is turned a definite amount, and then dropped back to its initial position. During a marking operation the marking die engaging the orange is held fixed with respect to the casing, by virtue of the lock means described with particular reference to Fig. 7. During angular turning movement of the wheel 68, one of the upper dies is contacted with the periphery of the inking roller 128, so that a proper amount of ink is supplied to this die, before this die is brought into position to engage the surface of an orange.

A particular characteristic of this appliance is that the wheel 68 is not being rotated, while the machine is not performing marking operations. Therefore the dies are not provided with an excessive quantity of ink, such as frequently results in marking machines used in the past. A further feature of importance is that the appliance is a complete unit of itself. Therefore, in order to secure a desired capacity it is a simple matter for a fruit packing house to utilize as many of such units as are necessary for their operations. Such units can be mounted side-by-side in batteries, or can be installed in locations where marking operations are desired.

Because of the rapidity with which the machine operates, successive articles of fruit may be virtually in contact as they are passed beneath the casing, with a perfect marking upon each article of fruit without smudging. In spite of the compact and relatively simple nature of the appliance, the mark produced is equal if not superior to cumbersome and complicated machines which are now being used in the citrus industry.

I claim:

1. In a fruit marking appliance, a fruit conveyor, a casing movably supported over the conveyor whereby fruit moved by the conveyor is caused to roll under the casing to contact its lower wall and thereby elevate the same, fruit marking means carried by said casing, said fruit marking means including a rotatable member carrying a plurality of marking dies, actuating means for moving said dies successively into marking position with respect to fruit passed beneath the casing, and trip means carried by the casing and adapted to be engaged by fruit passing beneath the casing, for initiating operation of said actuating means.

2. In a fruit marking appliance, a fruit conveyor, a casing pivotally supported over the conveyor, whereby fruit moved by the conveyor is caused to roll under the casing to contact its lower wall and thereby elevate the same, fruit marking means carried by the casing, said fruit marking means including a wheel carrying a plurality of circumferentially spaced marking dies, the lower wall of the casing having an opening to accommodate said dies, actuating means adapted to intermittently turn said wheel by successive angular increments, whereby successive marking dies on said wheel are brought into marking position within said opening, and trip means carried by said casing adjacent said opening, for initiating operation of said actuating means.

3. In a fruit marking appliance, a fruit conveyor, a casing pivotally supported over the conveyor for swinging movement in a vertical direction, whereby fruit moved by the conveyor is caused to roll under the free end of the casing to contact the lower wall of the casing and thereby elevate the same, fruit marking means carried by casing, said fruit marking means including a wheel mounted for rotation within the casing and a plurality of marking dies mounted upon the periphery of said wheel, the lower wall of the casing having an opening near the free end of the casing to accommodate the marking dies in a position to engage the surface of the fruit, electrical means adapted when energized to ratchet the wheel through angular increments to bring successive marking dies into a marking position within said opening, a trip member movably carried by the casing, said trip member including a portion extending through an opening in the lower wall of the casing which is adjacent said first named opening and in a path the fruit passed below the casing, and an electrical circuit energized by operation of said trip lever for actuating said motive means.

4. In a fruit marking appliance, a fruit conveyor, a casing pivotally supported over the conveyor for swinging movement in a vertical direction, whereby fruit moved by the conveyor is caused to roll under the free end of the casing to contact the lower wall of the casing and thereby elevate the same, a wheel rotatably carried within the casing, a plurality of circumferentially spaced marking dies mounted upon the periphery of said wheel, the lower wall of the casing adjacent the free end of the same having an opening to accommodate one of said marking dies, ratcheting mechanism for turning said wheel through angular increments sufficient to bring successive marking dies into position within said opening, electric motive means for operating said ratcheting mechanism, means including a trip lever having a portion extending into the path of movement of fruit for energizing said motive means, and inking means carried by the casing for applying ink to said marking dies.

5. In a fruit marking appliance, a fruit conveyor, a casing pivotally supported over the conveyor to swing in a vertical direction, whereby fruit moved by the conveyor is caused to roll under the free end of the casing to contact the lower wall of the casing and to thereby elevate the same, a wheel rotatably carried within the casing, a plurality of circumferentially spaced marking dies mounted upon the periphery of said wheel, the lower wall of the casing having an opening to accommodate one of the marking dies of the wheel, electric motive means carried by the casing, trip means carried by the casing and adapted to be operated by movement of fruit under the casing for energizing said motive means, and mechanism connecting the motive means with said wheel, serving to turn the same an angular amount sufficient to bring a successive marking die within said opening and also serving to elevate the wheel with respect to the casing during such turning movement.

6. In a fruit marking appliance, a fruit conveyor, a casing pivotally supported over the conveyor for swinging movement in a vertical direction, whereby fruit moved by the conveyor is caused to roll under the free end of the casing to contact and elevate the casing, a wheel rotatably carried within the casing, a plurality of circumferentially spaced marking dies mounted upon the periphery of said wheel, the lower wall of the casing adjacent the free end of the casing having an opening to accommodate one of said marking dies, electrical motive means carried by the casing, trip means adapted to be operated by movement of fruit beneath the casing for energizing said motive means, ratcheting mechanism connecting the motive means with said wheel, whereby upon operation of said trip means said wheel is turned an angular amount sufficient to bring a successive marking die within said opening, and cam means associated with said ratcheting mechanism and serving to elevate said wheel during said angular turning movement.

7. In a fruit marking appliance, a fruit conveyor, a casing pivotally supported over the conveyor for swinging movement in a vertical direction, whereby fruit moved by the conveyor is caused to roll under the free end of the casing to contact and elevate the casing, a wheel rotatably carried within the casing, a plurality of circumferentially spaced marking dies mounted upon the periphery of said wheel, the lower wall of the casing adjacent the free end of the casing having an opening to accommodate one of said marking dies, electrical motive means carried by the casing, trip means adapted to be operated by movement of fruit beneath the casing for energizing said motive means, ratcheting mechanism connecting the motive means with said wheel, whereby upon operation of said trip means said wheel is turned an angular amount sufficient to bring a successive marking die within said opening, cam means associated with said ratcheting mechanism and serving to elevate said wheel during said angular turning movement, and an electrical heating element associated with said wheel and serving to conduct heat to said marking dies.

8. In a fruit marking appliance, a fruit conveyor, a casing pivotally supported over the conveyor for swinging movement in a vertical direction, whereby fruit moved by the conveyor is caused to roll under the free end of the casing to contact and elevate the casing, a wheel rotatably carried within the casing, a plurality of circumferentially spaced marking dies mounted upon the periphery of said wheel, the lower wall of the casing adjacent the free end of the casing having an opening to accommodate one of said marking dies, electrical motive means carried by the casing, trip means adapted to be operated by movement of fruit beneath the casing for energizing said motive means, ratcheting mechanism connecting the motive means with said wheel, whereby upon operation of said trip means said wheel is turned an angular amount sufficient to bring a successive marking die within said opening, cam means associated with said ratcheting mechanism and serving to elevate said wheel during said angular turning movement, an electrical heating element associated with said wheel and serving to conduct heat to said marking die, and means serving to apply ink to marking dies.

9. In a fruit marking appliance, a fruit conveyor, a casing pivotally supported over the conveyor for swinging movement in a vertical direction, whereby fruit moved by the conveyor is caused to roll under the free end of the casing to contact and elevate the casing, a wheel rotatably carried within the casing, a plurality of circumferentially spaced marking dies mounted upon the periphery of said wheel, the lower wall of the casing adjacent the free end of the casing having an opening to accommodate one of said marking dies, electrical motive means carried by the casing, trip means adapted to be operated by movement of fruit beneath the casing for energizing said motive means, ratcheting mechanism connecting the motive means with said wheel, whereby upon operation of said trip means said wheel is turned an angular amount sufficient to bring a successive marking die within said opening, cam means associated with said ratcheting mechanism and serving to elevate said wheel during said angular turning movement, and means released by elevation of said wheel for locking the same against turning movement with respect to the casing.

10. In a fruit marking appliance, a fruit conveyor, a mounting movably supported over the conveyor, said mounting affording a lower wall whereby fruit moved by the conveyor is caused to roll under the mounting to contact said lower wall and thereby elevate the mounting, fruit marking means carried by said mounting, said fruit marking means including a movable member carrying a plurality of marking dies, actuating means for moving said dies successively into marking position with respect to fruit passing beneath said lower wall, and trip means carried by the mounting and adapted to be engaged by fruit passing beneath the lower wall, for initiating operation of said actuating means.

11. In a fruit marking appliance, a fruit conveyor, a casing movably supported over the conveyor whereby fruit moved by the conveyor is caused to roll under the casing to contact its lower wall and thereby elevate the same, fruit marking means carried by said casing to mark upon fruit rolled beneath the casing, said fruit marking means including a movable member carrying a marking die, actuating means for elevating said member and said die with respect to the lower wall of the casing, and trip means carried by the casing and adapted to be engaged by fruit passing beneath the casing for initiating operation of said actuating means.

12. In a fruit marking appliance, a fruit conveyor, a mounting movably supported over the conveyor, said mounting including a lower wall whereby fruit moved by the conveyor is caused to roll under the mounting to contact said lower wall and thereby elevate the mounting, fruit marking means carried by said mounting, said fruit marking means including a movable member carrying a plurality of marking dies, actuating means for moving said dies successively into marking position with respect to fruit passing beneath the mounting and for elevating said member relative to the mounting during such movement of said dies, and trip means adapted to be engaged by fruit passing beneath the mounting for initiating operation of said actuating means.

13. In a fruit marking appliance, a fruit conveyor, a casing movably supported over the conveyor whereby fruit moved by the conveyor is caused to roll under the casing to contact its lower wall and thereby elevate the same, fruit marking means carried by said casing, said fruit marking means including a movable member carrying a plurality of marking dies, actuating means for moving said dies successively into marking position with respect to fruit passing beneath the casing and for elevating said member relative to the casing, and trip means adapted to be engaged by fruit passing beneath the casing for initiating operation of said actuating means.

14. In a fruit marking appliance, a fruit conveyor, a casing pivotally supported over the conveyor for swinging movement in a vertical direction, whereby fruit moved by the conveyor is caused to roll under the free end of the casing to contact and elevate the casing, a wheel rotatably carried within the casing, a plurality of circumferentially spaced marking dies mounted upon the periphery of said wheel, the lower wall of the casing adjacent the free end of the casing having an opening to accommodate one of said marking dies, motive means carried by the casing, trip means adapted to be operated by movement of fruit beneath the casing for energizing said motive means, ratcheting mechanism connecting the motive means with said wheel, whereby upon operation of said trip means said wheel is turned an angular amount sufficient to bring a successive marking die within said opening, and means associated with said ratcheting mechanism and serving to elevate said wheel during said angular turning movement.

HAROLD J. MUMMA.